United States Patent [19]

Baluteau

[11] Patent Number: 4,568,153
[45] Date of Patent: Feb. 4, 1986

[54] BINOCULAR TELESCOPE

[75] Inventor: Jean-Michel Baluteau, Livry Gargan, France

[73] Assignee: Societe d'Optique, Precision Electronique & Mecanique-SOPELEM, Levallois-Perret, France

[21] Appl. No.: 518,325

[22] Filed: Aug. 1, 1983

Related U.S. Application Data

[63] Continuation of Ser. No. 267,986, May 28, 1981, abandoned.

[30] Foreign Application Priority Data

Jun. 12, 1980 [FR] France ............................. 80 13085

[51] Int. Cl.[4] ........................ G02B 13/16; G02B 23/12
[52] U.S. Cl. ..................................... 350/538; 350/545
[58] Field of Search ............... 350/173, 145, 514, 538, 350/545, 559, 557; 250/213 VY

[56] References Cited

U.S. PATENT DOCUMENTS 4,398,788  8/1983  Dietz ................................. 350/550

FOREIGN PATENT DOCUMENTS 596913   4/1934  Fed. Rep. of Germany ........ 350/35
922184   1/1947  France ................................. 350/35
1154521  11/1957  France ................................. 350/35
928215   6/1963  United Kingdom .................. 350/35

Primary Examiner—Davis L. Willis
Assistant Examiner—Matthew W. Koren
Attorney, Agent, or Firm—Pollock, Vande Sande & Priddy

[57] ABSTRACT

A binocular observation device for a single real or aerial image with a short focal length, comprising an optical element having a semi-reflecting surface permitting the passage of light towards a convergent eyepiece and deflecting the light onto a convergent group of lenses centered about a frontal optical axis which is oblique with respect to the optical axis of the eyepiece, and followed at the rear by a reflective component the optical reflected axis of which is displaced by the interpupillary distance of the eyepiece relative to this axis.

7 Claims, 1 Drawing Figure

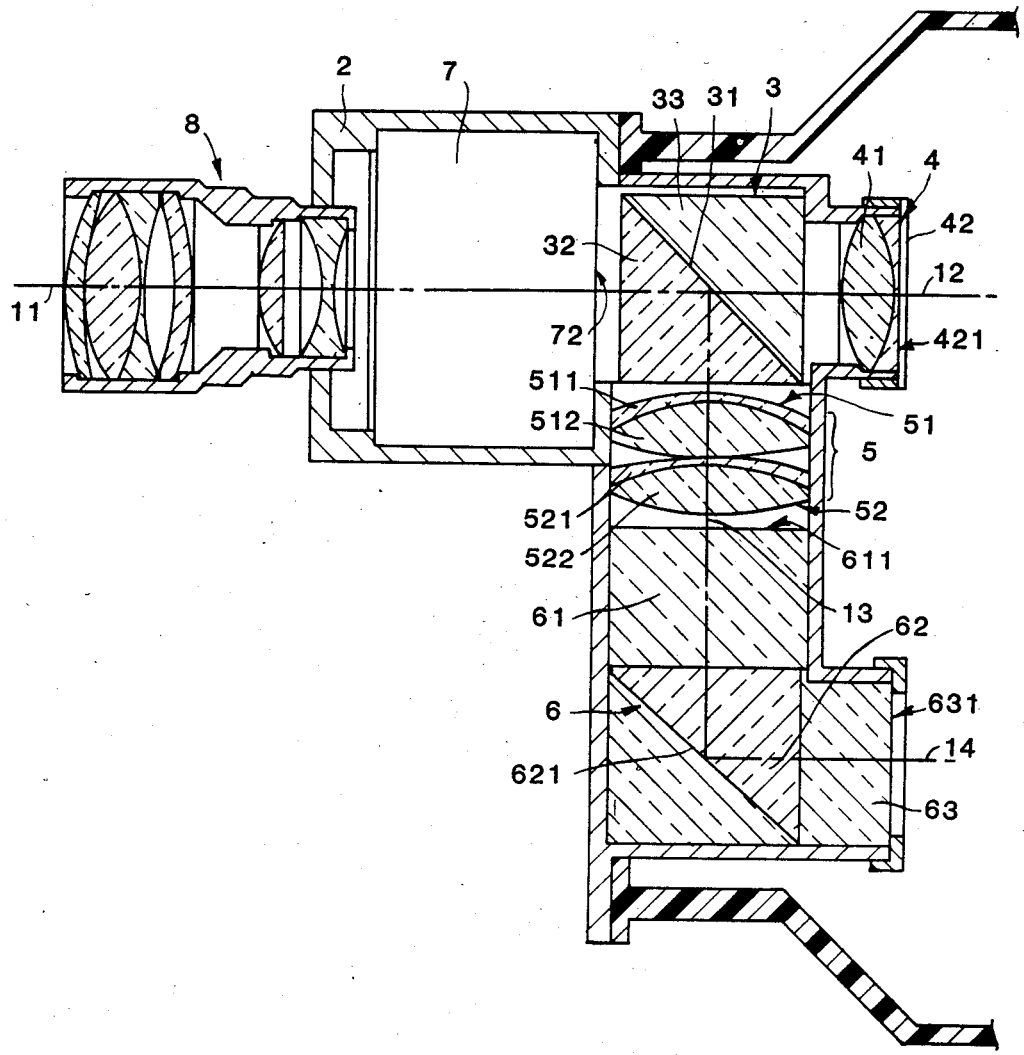

BINOCULAR TELESCOPE

This application is a continuation of application Ser. No. 267,986, filed May 28, 1981, now abandoned.

FIELD OF THE INVENTION

The present invention relates to a binocular observation device for viewing of a single image and to the application of this device in a telescope intended for daytime or nighttime observation.

BACKGROUND

Binocular viewing devices such as, for example, those mounted on microscopes usually comprise two rhomboid-shaped prisms reflecting two beams spaced apart by the interpupillary distance and observed by the oculars. These devices are very suitable when one wishes to observe an aerial image which is formed in the lenses of rhomboid-shaped prisms. These devices are not satisfactory when one wishes to observe a real image with a short ocular focal length.

Optical apparatus for binocular viewing comprising only a single optical system providing two beams at the interpupillary distance which may be observed directly are also known. These binocular apparatus are limited because they do not allow short focal lengths without viewing becoming difficult. Moreover, the correction of aberrations is difficult.

In nocturnal observation instruments fitted with light intensification tubes such as those described for example in French Pat. No. 2,123,564 and its additions, it is necessary to observe the real image at the exit to the light intensification tube. Known binocular devices are used with difficulty to observe this image especially if one wishes the focal length of the eyepieces to be as short as possible.

SUMMARY OF THE INVENTION

The present invention relates to a binocular observation device for a single real or aerial image with a short focal length. The device may be mounted in a single lens telescope. The bulkiness is reduced, which allows the device to be formed into a light and portable instrument of low cost. The device allows for the adjustment of the interpupillary distance and the adjustment of the focalization. The invention also relates to the application of the device in a telescope provided with a single objective and permitting observation by night.

The binocular device according to the invention essentially comprises an optical element provided with a semi-reflecting surface allowing the light to pass through towards a convergent eyepiece and deflecting the light onto a convergent group of lenses centered about a frontal optical axis, oblique in relation to the optical axis of the said eyepiece, and followed by a reflective component at the rear, the optical reflected axis of which is displaced by the interpupillary distance in relation to this axis of the said eyepiece.

According to one characteristic of the invention, the reflective component is composed of a prism, a sheet with parallel surfaces attached to the front surface of this prism and a sheet with parallel surfaces attached to the rear surface of this prism.

The invention will now be described in greater detail by referring to an embodiment given by way of example and illustrated in the attached drawing:

BRIEF DESCRIPTION OF THE DRAWINGS

The single FIGURE shows a section passing through the optical axes of two eyepieces of a telescope fitted with a binocular device according to the invention.

DETAILED DESCRIPTION

The binocular device which is illustrated is housed in a housing 2 and comprises two eyepieces which transmit two beams centered around two parallel axes 12 and 14 separated by the interpupillary distance.

The light beam emerging from the image observed in the device is centered around an axis 11 known as the principal axis. The light beam emerging from the image is received by a semi-reflecting optical element 3 which allows the beam to pass along the optical axis 12 and which deflects the beam along the oblique frontal optical axis 13. This optical element is provided with a semi-reflecting surface 31 which allows the light to pass along the optical axis 12 coaxial to 11. This surface 31 is positioned at 45° to the optical axis 11, the reflected axis 13 being perpendicular to 11 and 12. The element 3 is composed, for example, of two isosceles rectangular prisms 32 and 33 housed so as to form a cube the semi-reflecting surface 31 of which would pass through two parallel edges. A part of the light passes through the semi-reflecting optical element 3 in order to travel towards the eyepiece 4. Another part of the light is reflected along the frontal optical axis 13.

The convergent eyepiece 4 centered about the axis 12 is housed behind the element 3 while being separated from the prism 33 by an air gap. This eyepiece, in the embodiment shown, is formed by a doublet comprising towards the front a convergent lens 41 and towards the rear a divergent lens 42, the two lenses being joined to one another. The axis 12 is an extension of the principal axis 11. The eyepiece preferably allows vision by the guiding eye which observes directly behind this ocular.

The second eyepiece comprises a convergent group or system of lenses 5 centered about the frontal axis 13 and a reflective component 6 serving to translate the image transmitted by the system of lenses and to reflect the light beam from the frontal axis 13 to the axis 14. The group of lenses 5 is composed, for example, towards the front of a convergent doublet 51 separated by an air space from the prism 32, and towards the rear, of a convergent doublet 512 or 522, the two lenses being joined to one another. This structure with double doublets favors the correction of aberrations.

The focuses of the eyepiece 4 and the lens system 5 converge. The diameter of the lenses in the system 5 is greater than the diameter of the lenses in the doublet.

The reflective component 6, is arranged to the rear of the system of lenses 5 from which it is separated by an airspace. This reflective component which forms a continuous crossing of lenses draws near the exit pupil of the system 5 by a reflection on the reflective surface 621 reflecting the optical axis 13 to 14. This reflective component preferably has no power. It comprises at the entrance a plane surface 611 perpendicular to 13 and at the exit a plane surface 631 perpendicular to 14. The reflective surface 621 is inclined at 45 ° in relation to the frontal axis 43. It is parallel to the semi-reflecting surface 31 so that the principal optical axis incident to the surface 31 and the reflected optical axis 14 are parallel and displaced laterally. This reflective component 6 is divided up for example into a sheet with parallel surfaces 61 centered about the frontal axis 13 formed into a reflecting prism 62 and a sheet with parallel surfaces 63 centered about the lateral optical axis 14. The prism 62 is a rectangular isosceles prism with total reflection. The sheet with parallel surfaces 61 which is positioned perpendicularly to the axis 13, between the prism 62 and the converging group of lenses 5, is joined to the front surface of the prism 62, and it is separated by an air gap from the group of lenses 5. The sheet with parallel surfaces 63 which is positioned perpendicularly to the axis 14 is attached to the rear surface of the prism 62. The lens crossing in the assembly 6 causes a translation of the pupil towards the system 5 and a wider field. The plane surface 631 is situated substantially at the same distance from the axis as the rear surface 421 from the lens 42 of the eyepiece 4.

The adjustment of the interpupillary distance may be effected by relative displacement according to the axis 13 of the reflector 5-6. The focusing adjustment is carried out by the ocular 4 and by relative displacement of the device in relation to the image.

The binocular device described above serves to observe an actual image. In particular, this binocular device may be connected to a telescope provided with a light intensification tube such as the one shown in the attached diagram. It thus permits observation of the image formed on the exit 72 of the light intensification tube 7 which is in the focus of the ocular 4 and the lens system 5. This tube 7 is mounted at the rear of an objective 8 which is centered about the principal optical axis 11 coaxial to the axis 12 of the eyepiece 4. The image furnished by the objective 8 is received at the entrance to the light intensification tube.

Of course, it is possible, without deviating from the course of the invention, to conceive variations and improvements in details and even to envisage the use of equivalent means.

Thus, the reflective component 6 may be constructed in one piece.

What is claimed is:

1. Binocular observation device for viewing a real or aerial image with both eyes, comprising
   (a) a convergent first eyepiece (4) centered about an optical axis (11, 12) and having its focus substantially in said image (72) which is centered on said axis;
   (b) an optical element (3) located between said first eyepiece (4) and said image (72) and provided with a semi-reflective surface (31) which reflects the light emerging from said image from said optical axis (11) to a frontal optical axis (13) and permits the passage of light emerging from said image toward said first eyepiece (4) and one eye;
   (c) a convergent group of lenses (5) constituting a second eyepiece about said frontal optical axis (13) and having its focus substantially in said image; and
   (d) a reflective component (6) located at the rear of said group of lenses (5) so as to reflect the light emerging from said convergent group of lenses towards the other eye.

2. Device according to claim 1, wherein said first eyepiece (4) and said group of lenses (5) have substantially the same focal length.

3. Device according to claim 1 or 2, wherein a surface (631) of said reflective component (6) which is located at the rear in relation to the propagation direction of the light and a surface (421) of said first eyepiece which is located at the rear in relation to said direction are situated at an equal distance in relation to said frontal optical axis.

4. Device according to claim 1 or 2, wherein said reflective component (6) is composed of a prism having a front surface by which the beam coming from said group of lenses enters and a rear surface by which said beam emerges, a sheet with parallel surfaces (61) centered about said frontal optical axis (13) and attached to said front surface of said prism (62) and of a sheet with parallel surfaces (63) attached to said rear surface of said prism (62).

5. Device according to claim 1 or 2, wherein said reflective component (6) has no power.

6. Device according to claim 1 or 2, wherein said group (5) of convergent lenses is composed of two convergent doublets (51, 52), each formed of a divergent lens arranged towards the front and a convergent lens arranged towards the rear, these two lenses being attached to one another.

7. Device according to claim 1 or 2, comprising an objective (8), a light intensification tube (7) having an entrance receiving an image furnished by said objective and an exit on which is formed said real image.

* * * * *